(12) United States Patent
Clark

(10) Patent No.: US 10,745,096 B2
(45) Date of Patent: Aug. 18, 2020

(54) VIRTUAL ANCHOR PROXIMITY SYSTEM

(71) Applicant: NAVICO HOLDING AS, Egersund (NO)

(72) Inventor: Jeremiah D. Clark, Tulsa, OK (US)

(73) Assignee: NAVICO HOLDING AS, Egersund (NO)

( * ) Notice: Subject to any disclaimer, the term of this patent is extended or adjusted under 35 U.S.C. 154(b) by 365 days.

(21) Appl. No.: 15/672,873

(22) Filed: Aug. 9, 2017

(65) Prior Publication Data

US 2019/0047675 A1    Feb. 14, 2019

(51) Int. Cl.
| | |
|---|---|
| *B63H 25/42* | (2006.01) |
| *B63B 23/30* | (2006.01) |
| *B63B 27/36* | (2006.01) |
| *B66C 13/02* | (2006.01) |
| *B63B 35/40* | (2006.01) |
| *G05D 1/02* | (2020.01) |
| *B63H 20/00* | (2006.01) |
| *B63B 35/00* | (2020.01) |
| *B63B 79/00* | (2020.01) |

(52) U.S. Cl.
CPC ............. *B63H 25/42* (2013.01); *B63B 23/30* (2013.01); *B63B 27/36* (2013.01); *B63B 35/40* (2013.01);
(Continued)

(58) Field of Classification Search
CPC ................. B63H 25/42; B63H 20/007; B63H 2025/425; B63B 23/30; B63B 27/36;
(Continued)

(56) References Cited

U.S. PATENT DOCUMENTS

| | | | | |
|---|---|---|---|---|
| 5,386,368 A | * | 1/1995 | Knight ................... | B63H 25/42 114/144 A |
| 5,491,636 A | * | 2/1996 | Robertson .............. | B63H 25/42 114/144 B |

(Continued)

FOREIGN PATENT DOCUMENTS

| | | |
|---|---|---|
| WO | WO 2006/017511 A2 | 2/2006 |
| WO | WO 2013/126761 A1 | 8/2013 |
| WO | WO 2014/144471 A1 | 9/2014 |

OTHER PUBLICATIONS

MotorGuide Pinpoint GPS for Trolling Motor product information (3 pgs.) www.motorguide.com/pinpointgps website visited Aug. 7, 2017.

(Continued)

*Primary Examiner* — Daniel L Murphy
(74) *Attorney, Agent, or Firm* — Nelson Mullins Riley & Scarborough LLP

(57) ABSTRACT

Virtual anchor features for a navigation/autopilot system for use on a marine vessel are provided herein. An example apparatus associated with a marine vessel includes a processor and memory including computer program code, the memory and the computer program code configured to, with the processor, cause the apparatus to receive user input indicating at least a first geographic location and a desired offset distance; determine a current geographic location of at least one of the marine vessel or the apparatus; determine if the current geographic location is within a distance threshold of the desired offset distance from the first geographic location; and cause, in an instance in which the current geographic location is not within the distance threshold, one or more motors of the marine vessel to operate to cause the marine vessel to move to a new geographic location accordingly. A desired orbit pattern may also be employed.

20 Claims, 10 Drawing Sheets

(52) U.S. Cl.
CPC ............ *B63H 20/007* (2013.01); *B66C 13/02* (2013.01); *G05D 1/0208* (2013.01); *B63B 79/00* (2020.01); *B63B 2035/008* (2013.01); *B63H 2025/425* (2013.01)

(58) Field of Classification Search
CPC ... B63B 35/40; B63B 2035/008; B63B 79/00; B66C 13/02; G05D 1/0208; B63J 2099/008; B63J 2099/006
USPC ........................................................ 367/15
See application file for complete search history.

(56) References Cited

U.S. PATENT DOCUMENTS

| | | | |
|---|---|---|---|
| 6,678,589 B2 * | 1/2004 | Robertson | B63H 25/42 114/246 |
| 8,645,012 B2 | 2/2014 | Salmon et al. | |
| 8,761,976 B2 | 6/2014 | Salmon et al. | |
| 9,132,900 B2 | 9/2015 | Salmon et al. | |
| 2007/0162207 A1 * | 7/2007 | Shimo | B63H 25/04 701/42 |
| 2009/0037040 A1 | 2/2009 | Salmon et al. | |
| 2012/0015566 A1 * | 1/2012 | Salmon | B63H 21/21 440/1 |
| 2012/0232719 A1 * | 9/2012 | Salmon | G05D 1/0206 701/2 |
| 2014/0336854 A1 | 11/2014 | Salmon et al. | |

OTHER PUBLICATIONS

Minn Kota Spot-Lock Electronic GPS Anchor product information (4 pgs.) https://www.minnlotamotors.com/spot-lock/ website visited Aug. 7, 2017.

* cited by examiner

VIRTUAL ANCHOR PROXIMITY SYSTEM

FIELD OF THE INVENTION

Embodiments of the present invention relate generally to marine navigation and/or autopilot technology, and, more particularly, to virtual anchor features for marine navigation and/or autopilot systems.

BACKGROUND OF THE INVENTION

Marine vessels (e.g., watercraft) are often used during fishing or other marine activities. Motors (e.g., trolling motors) may be attached to a marine vessel and used to propel the marine vessel along a body of water. In some circumstances, trolling motors may provide secondary propulsion or precision maneuvering, such as can be ideal for fishing activities. Marine vessels may use navigation systems to aid in travel along the body of water. Depending on the configuration of the marine vessel and/or the motors, one or more autopilots may be utilized along with the navigation system to automatically control the direction and/or speed of travel for the marine vessel.

BRIEF SUMMARY OF THE INVENTION

Some marine vessels may be configured with one or more autopilots that can interact with a navigation system, such as to control the direction and/or speed of the marine vessel according to navigation instructions. Some navigation systems allow a user to select a desired waypoint or anchor point. This may be particularly beneficial to users who seek to fish a desired location. For example, a user may set a waypoint they would like to cast to, such as a place they have marked based on previous fishing activity (e.g., a position on the lake that has beneficial structure for attracting fish).

In some circumstances, a user may not want the boat to stay directly on top of the waypoint. Rather, some embodiments of the present invention contemplate that a user may want to be a set distance away, such as may be useful for knowing exactly how far to cast to hit the waypoint (e.g., where the beneficial structure is located). As such, some embodiments of the present invention seek to provide an improved method for users to select a waypoint and have the capability to maintain the marine vessel a specified distance away. In particular, in some embodiments, the marine vessel may automatically stay a specified offset distance away from the waypoint so that the user can fish to the waypoint instead of remaining on top of the waypoint. In some embodiments, the user can select a travel path (e.g., an orbit pattern) around the waypoint that automatically causes the marine vessel to travel around the waypoint in combination with the desired offset distance. Such example embodiments may permit the user to cast to the waypoint at a plurality of directions without having to manually control movement of the marine vessel.

In an example embodiment, an apparatus associated with a marine vessel is provided. The apparatus comprises a processor and memory including computer program code. The memory and the computer program code are configured to, with the processor, cause the apparatus to receive user input indicating at least a first geographic location and a desired offset distance. The memory and the computer program code are further configured to, with the processor, cause the apparatus to determine a current geographic location of at least one of the marine vessel or the apparatus and determine if the current geographic location is within a distance threshold of the desired offset distance from the first geographic location. The memory and the computer program code are further configured to, with the processor, cause the apparatus to cause, in an instance in which the current geographic location is not within the distance threshold, one or more motors of the marine vessel to operate to cause the marine vessel to move to a new geographic location that is within the distance threshold of the desired offset distance from the first geographic location.

In some embodiments, the memory and the computer program code are further configured to, with the processor, cause the apparatus to determine a navigation control signal for the one or more motors of the marine vessel. Operation of the one or more motors according to the navigation control signal may cause the marine vessel to move to the new geographic location. In some embodiments, the navigation control signal may comprise a distance for the marine vessel to travel to move to the new geographic location. In some embodiments, the navigation control signal may comprise a direction for the marine vessel to travel to move to the new geographic location.

In some embodiments, the memory and the computer program code are further configured to, with the processor, cause the apparatus to determine if the current geographic location is within the distance threshold of the desired offset distance from the first geographic location at predetermined time intervals.

In some embodiments, the memory and the computer program code are further configured to, with the processor, cause the apparatus to receive user input indicating a desired orbital path. The desired orbital path may define a pattern of travel of the vessel around the first geographic location that keeps the vessel within the distance threshold of the desired offset.

In some embodiments, the memory and the computer program code are further configured to, with the processor, cause the apparatus to determine a cast distance by comparing the current geographic location to the first geographic location and cause, via a user interface, display of the cast distance.

In some embodiments, the current geographic location of the at least one of the marine vessel or the apparatus is based on a global positioning system (GPS) signal or a sonar signal.

In some embodiments, the apparatus is a trolling motor.

In another example embodiment, a system associated with a marine vessel is provided. The system comprises a position sensor and an apparatus comprising a processor and memory including computer program code. The memory and the computer program code are configured to, with the processor, cause the apparatus to receive user input indicating at least a first geographic location and a desired offset distance. The memory and the computer program code are further configured to, with the processor, cause the apparatus to determine a current geographic location of at least one of the marine vessel or the system using the position sensor. The memory and the computer program code are further configured to, with the processor, cause the apparatus to determine if the current geographic location is within a distance threshold of the desired offset distance from the first geographic location. The memory and the computer program code are further configured to, with the processor, cause the apparatus to cause, in an instance in which the current geographic location is not within the distance threshold, one or more motors of the marine vessel to operate to cause the marine vessel to move to a new geographic location that is within the distance threshold of the desired offset distance from the first geographic location.

In yet another example embodiment, an apparatus associated with a marine vessel is provided. The apparatus comprises a processor and memory including computer program code. The memory and the computer program code are configured to, with the processor, cause the apparatus to receive user input indicating at least a first geographic location and a desired offset distance. The memory and the computer program code are further configured to, with the processor, cause the apparatus to receive user input indicating a desired orbital path around the first geographic location. The desired orbital path defines a pattern of travel of the marine vessel around the first geographic location that keeps the marine vessel within a distance threshold of the desired offset distance from the first geographic location. The memory and the computer program code are further configured to, with the processor, cause the apparatus to cause one or more motors of the marine vessel to operate to cause the marine vessel to travel according to the desired orbital path.

In some embodiments, the memory and the computer program code are further configured to, with the processor, cause the apparatus to determine a current geographic location of at least one of the marine vessel or the apparatus. The memory and the computer program code may be further configured to, with the processor, cause the apparatus to determine if the current geographic location is within a first distance threshold of the desired offset distance from the first geographic location and within a second distance threshold of the desired orbital path. In an instance in which the current geographic location is not within the first distance threshold and the second distance threshold, the memory and the computer program code may be further configured to, with the processor, cause the apparatus to determine a marine control signal for operating one or more motors of the marine vessel to cause the marine vessel to move to a new geographic location that is within the first distance threshold and within the second distance threshold. The marine control signal may comprise at least one of a distance or a direction. Additionally, the memory and the computer program code may be further configured to, with the processor, cause the apparatus to cause the one or more motors of the marine vessel to operate to cause the marine vessel to move to the new geographic location.

In some embodiments, the apparatus is a trolling motor.

In some embodiments, apparatus of claim 17, wherein the apparatus is a marine electronic device.

BRIEF DESCRIPTION OF THE DRAWINGS

Figure 1:
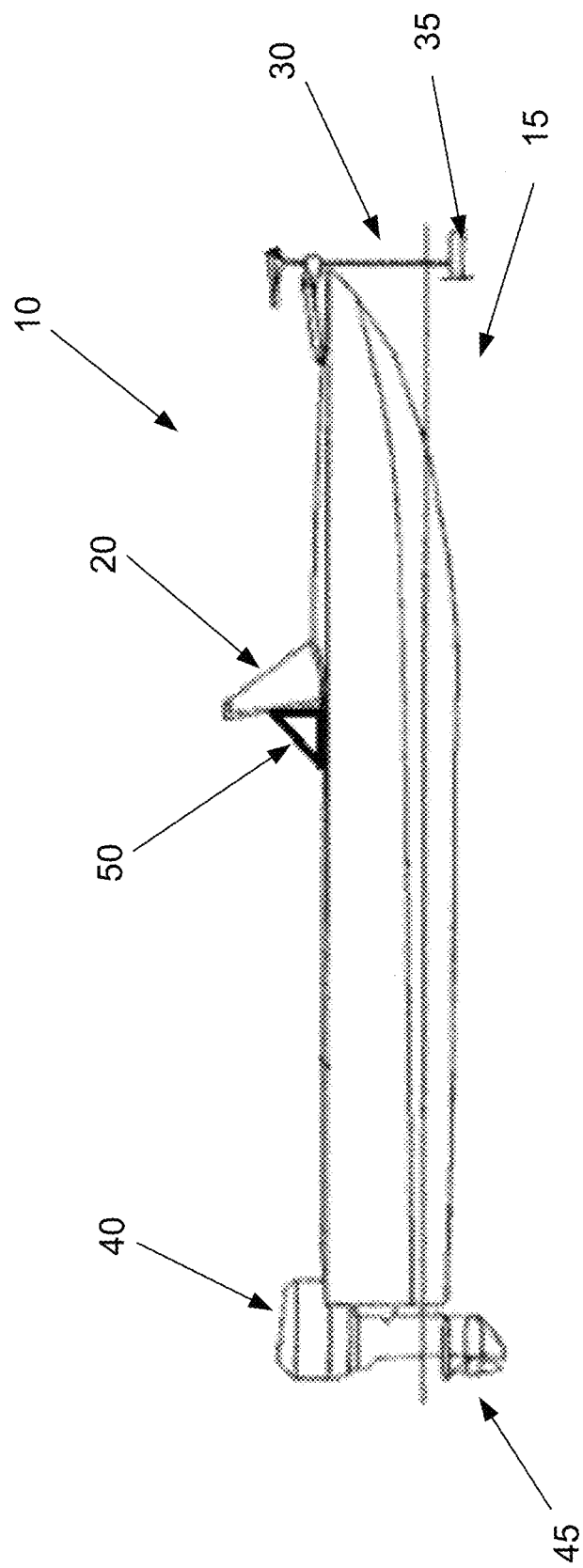
Figure 2:
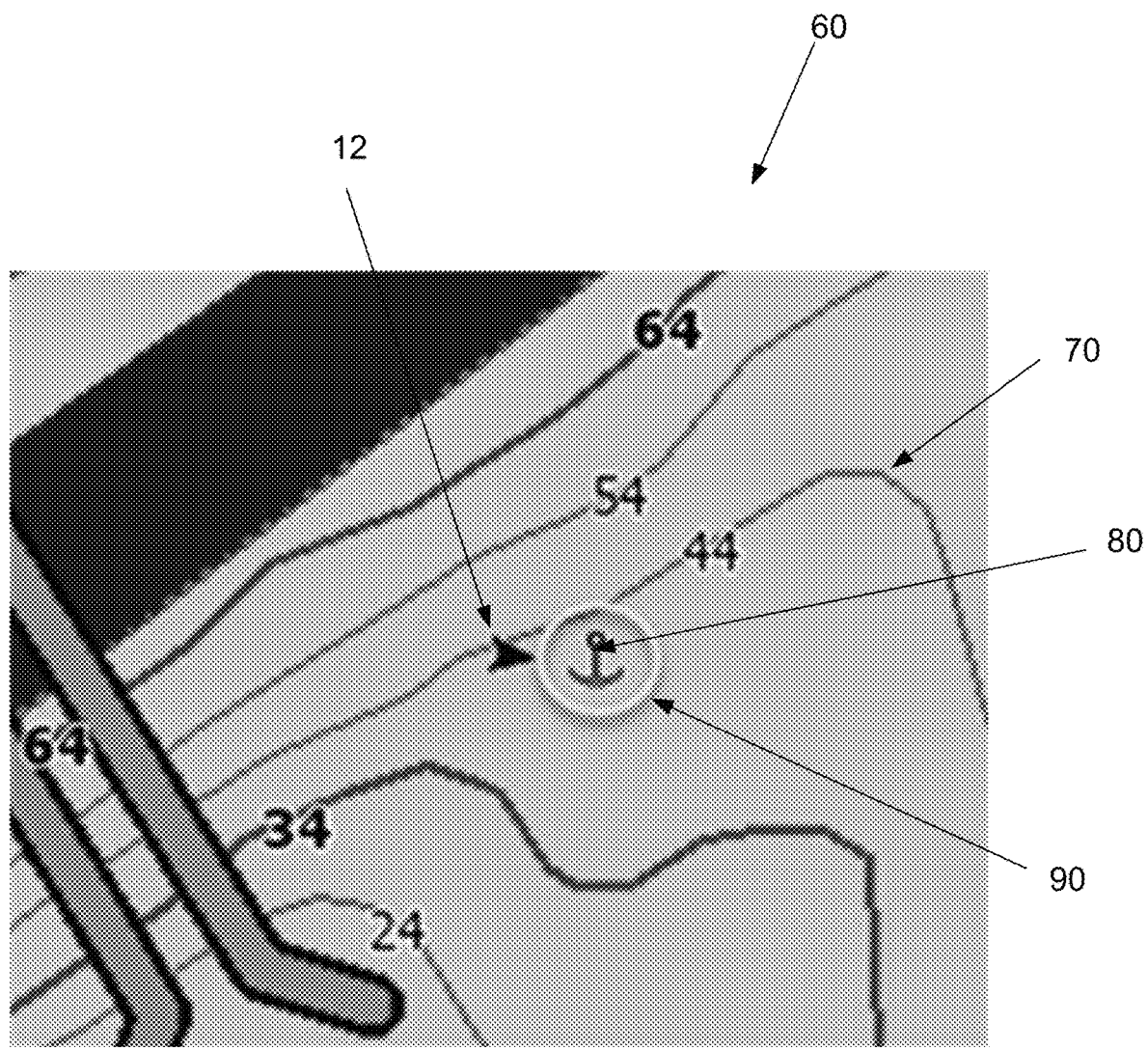
Figure 3:
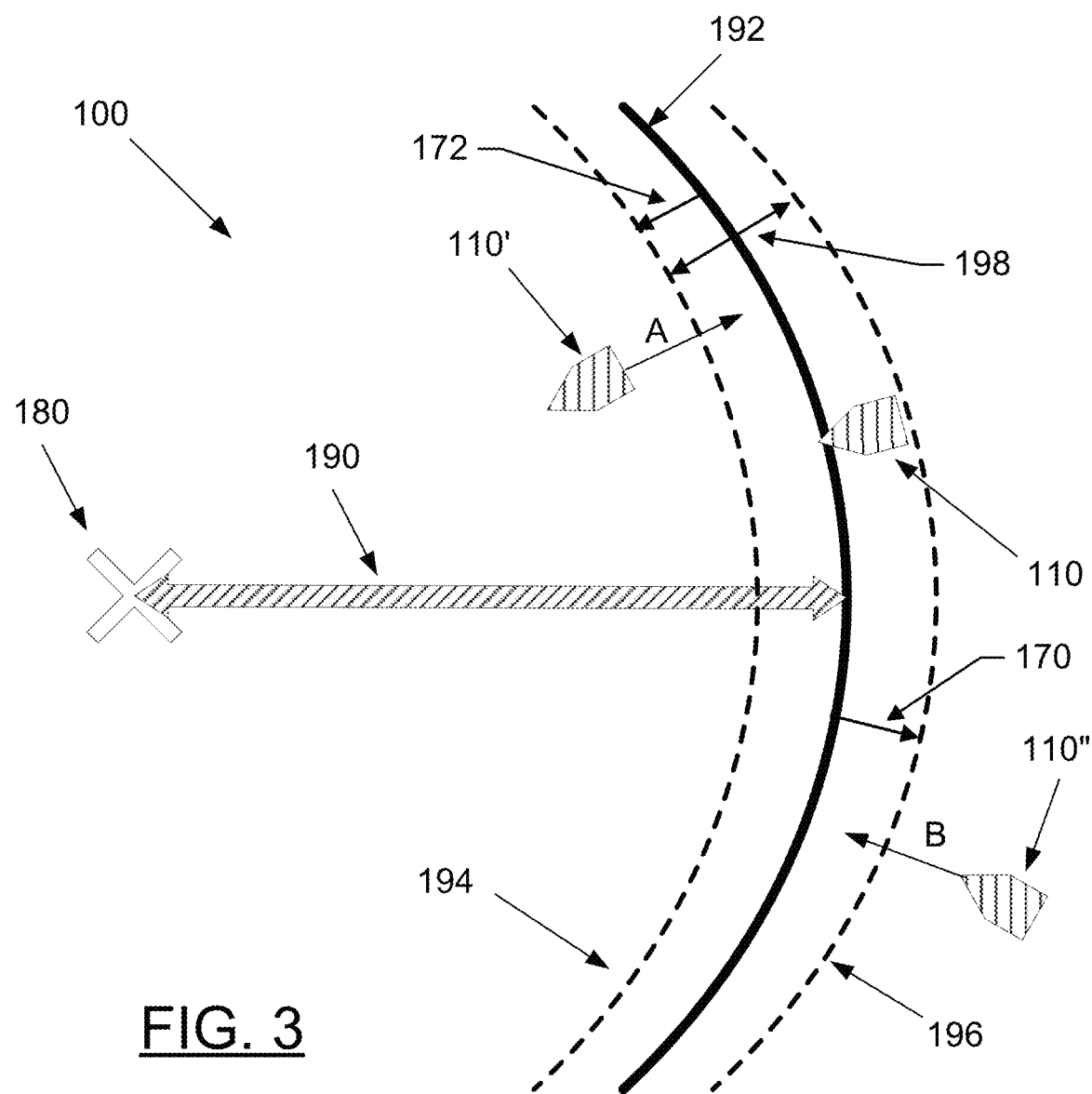
Figure 4A:
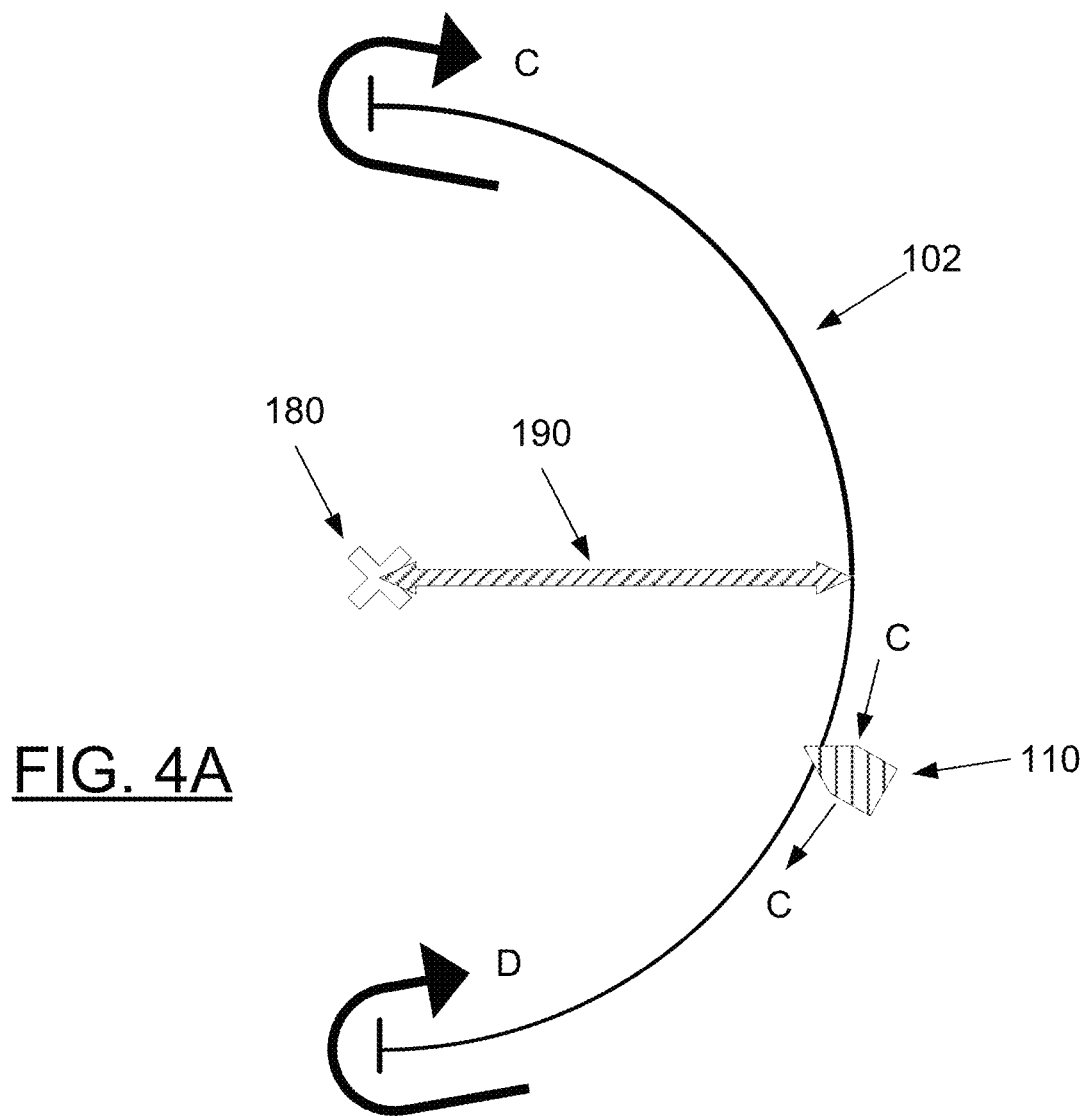
Figure 4B:
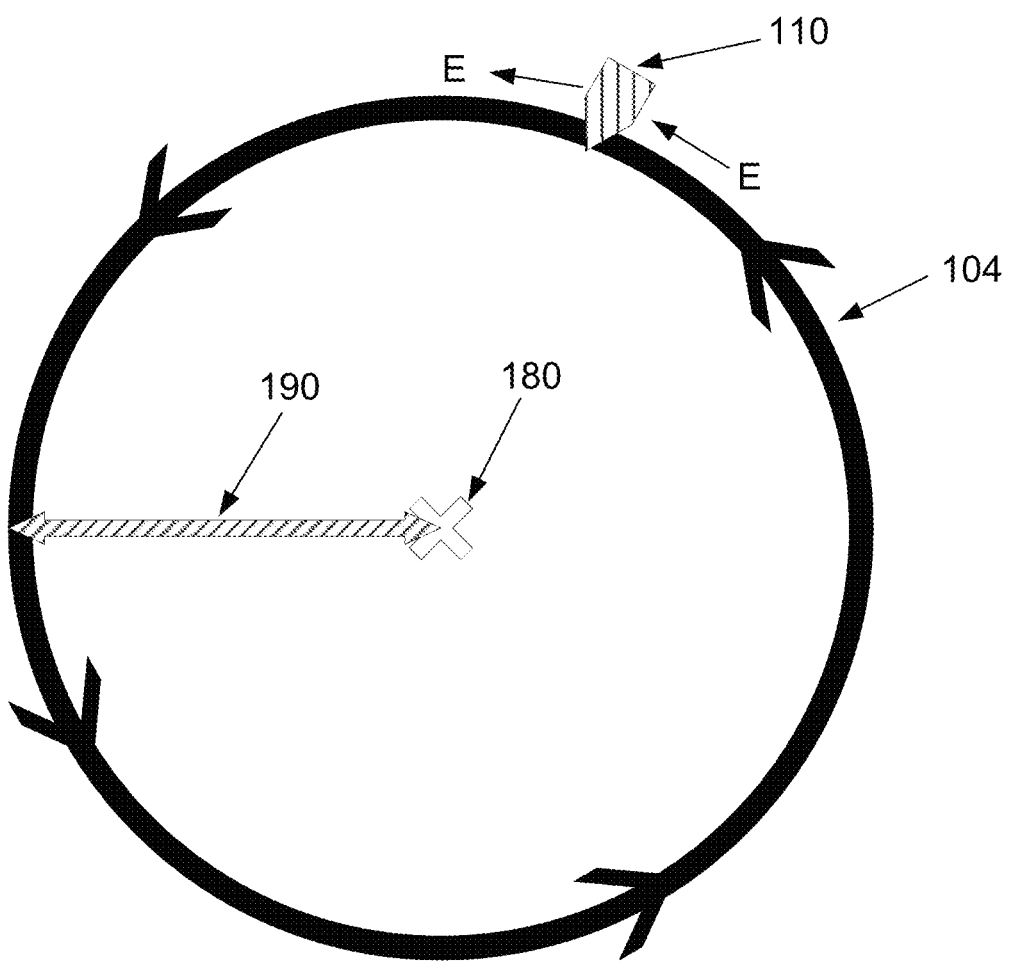
Figure 5:
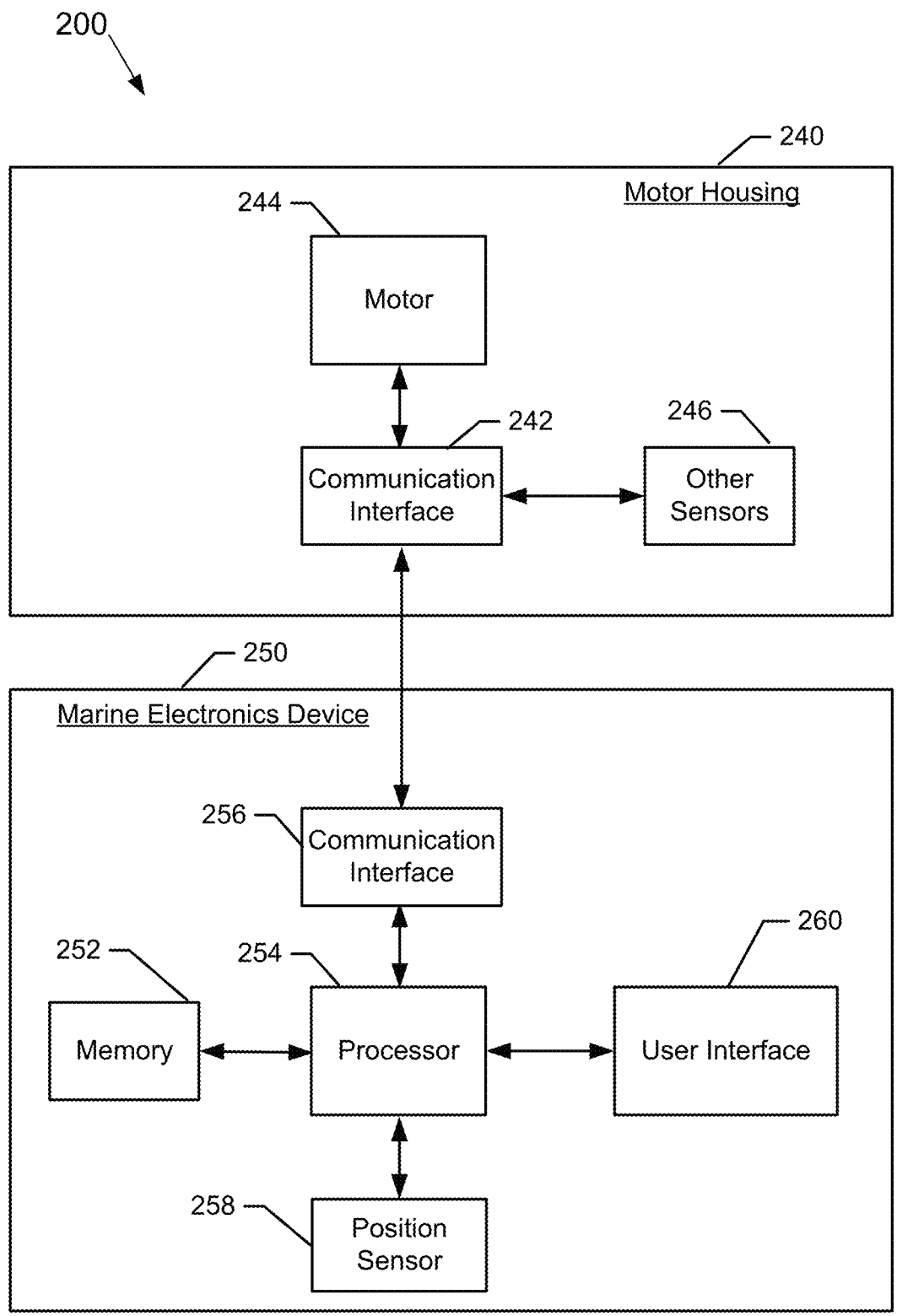
Figure 6:
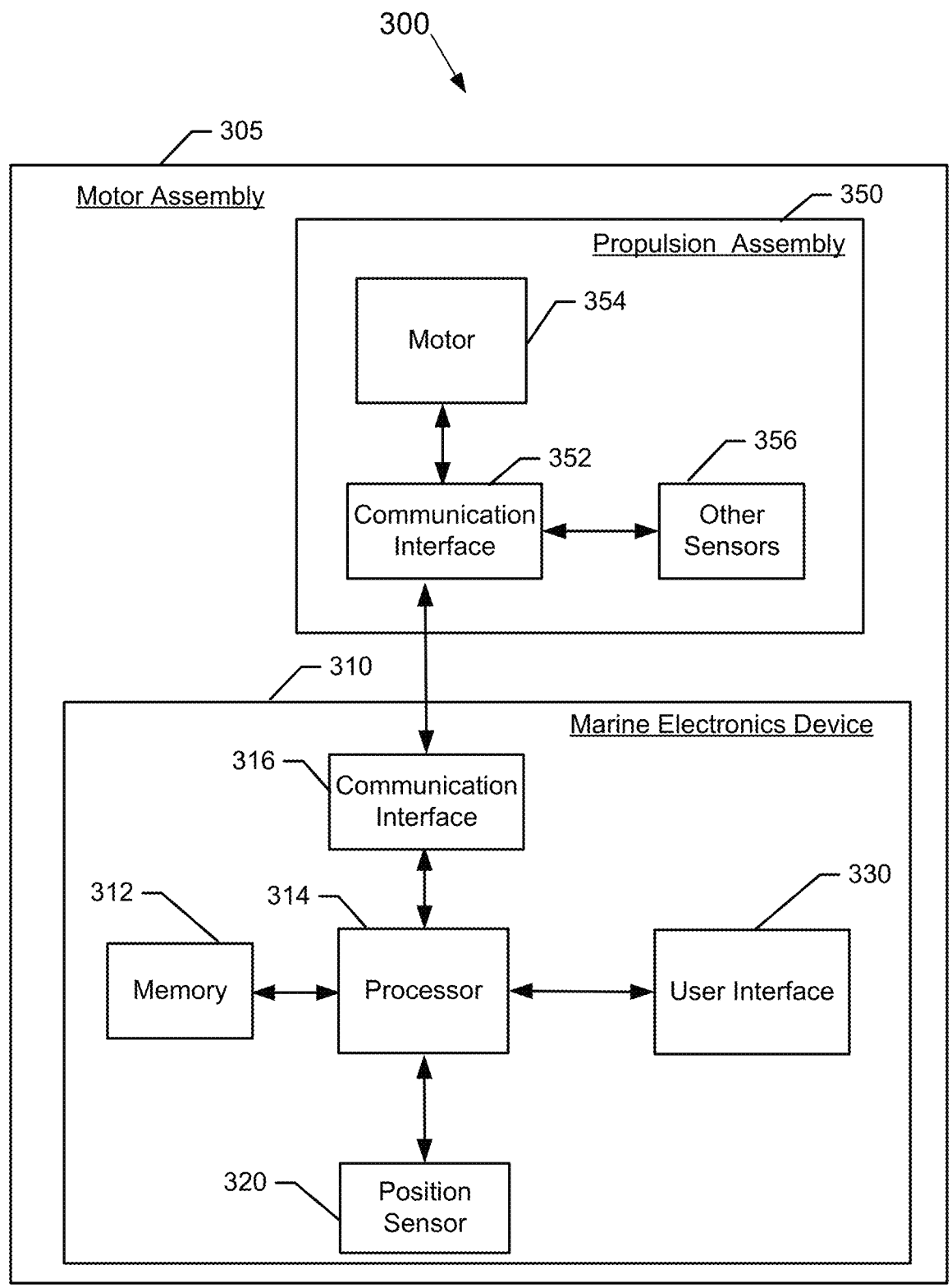
Figure 7:
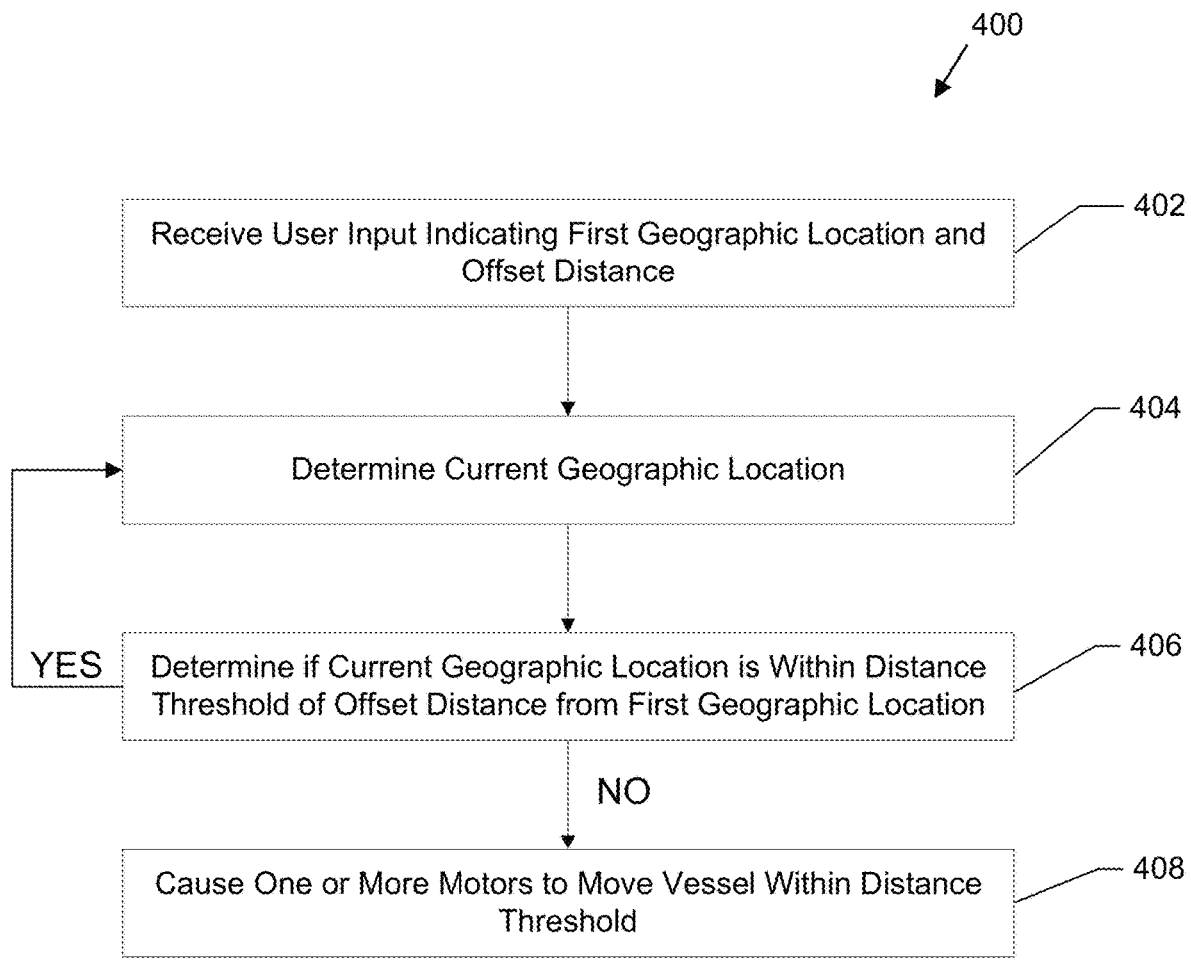
Figure 8:
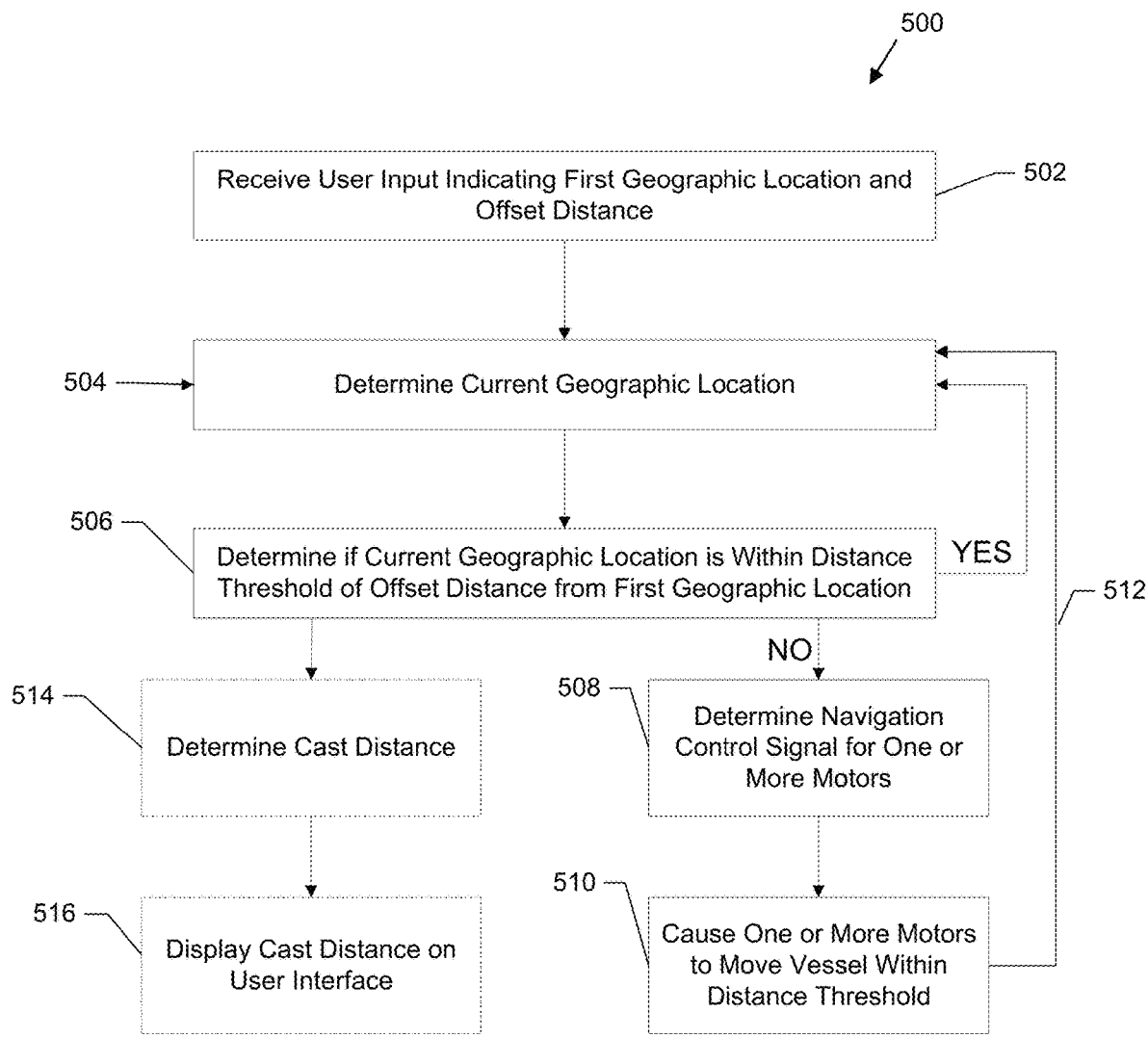
Figure 9:
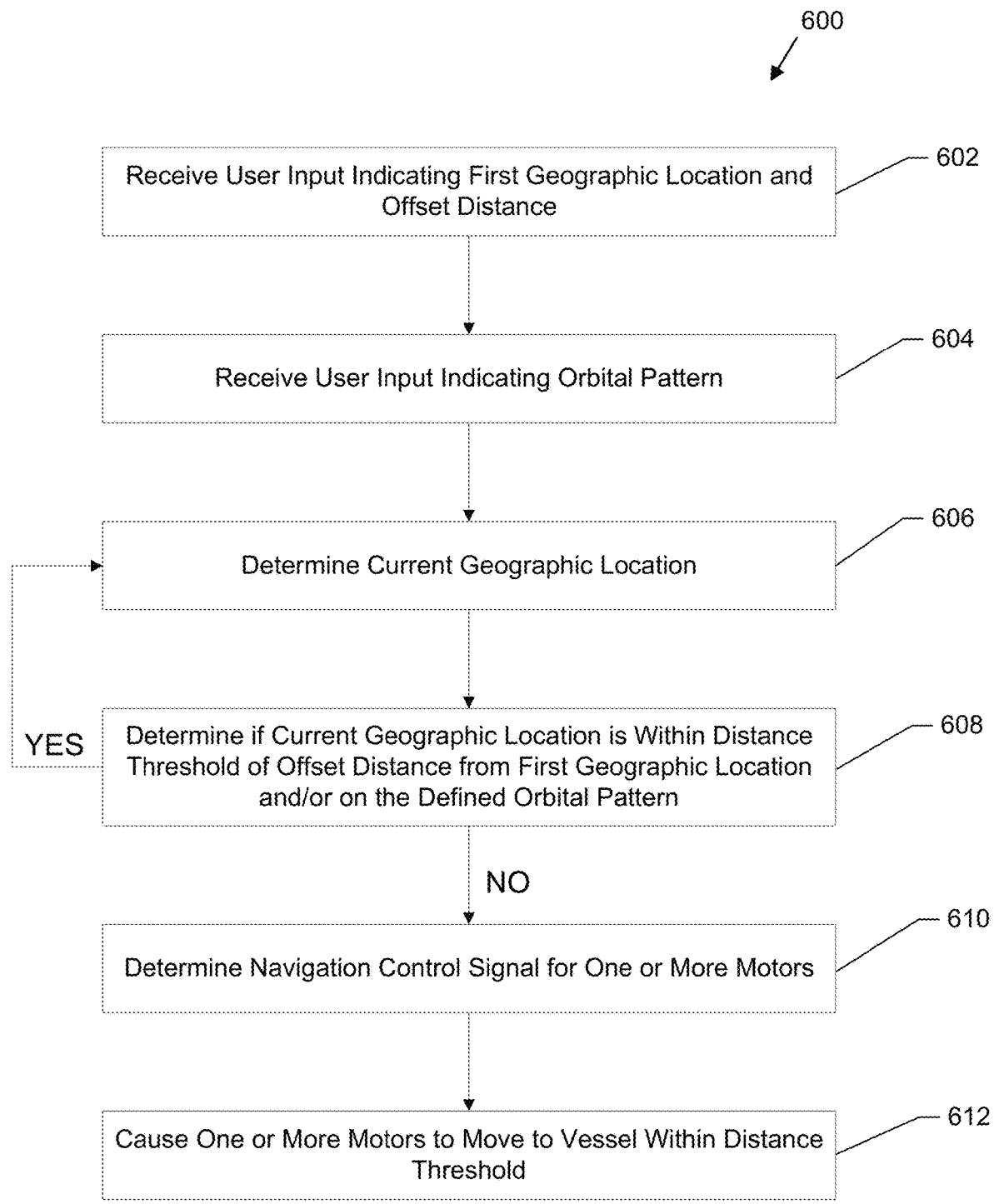

Having thus described the invention in general terms, reference will now be made to the accompanying drawings, which are not necessarily drawn to scale, and wherein:

FIG. 1 illustrates an example marine vessel, in accordance with some embodiments discussed herein;

FIG. 2 shows an example marine chart, in accordance with some embodiments discussed herein;

FIG. 3 shows a diagram illustrating an example offset distance from a waypoint, in accordance with some embodiments discussed herein;

FIG. 4A shows a diagram illustrating an example orbital pattern in conjunction with an offset distance from a waypoint, in accordance with some embodiments discussed herein;

FIG. 4B shows a diagram illustrating another example orbital pattern in conjunction with an offset distance from a waypoint, in accordance with some embodiments discussed herein;

FIG. 5 shows a block diagram illustrating an example system including an example motor housing and an example marine electronics device, in accordance with some embodiments discussed herein;

FIG. 6 shows a block diagram illustrating an example motor assembly, in accordance with some embodiments discussed herein;

FIG. 7 illustrates a flowchart of an example method for maintaining a marine vessel at a desired offset distance from a waypoint, in accordance with some embodiments discussed herein;

FIG. 8 illustrates a flowchart of an example method for maintaining a marine vessel at a desired offset distance from a waypoint and displaying the distance from the marine vessel to the waypoint, in accordance with some embodiments discussed herein; and FIG. 9 illustrates a flowchart of an example method for causing a marine vessel to travel along a desired orbit pattern while maintaining the marine vessel at a desired offset distance from a waypoint, in accordance with some embodiments discussed herein.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

FIG. 1 illustrates an example marine vessel (e.g., watercraft 10) on a body of water 15. The watercraft 10 has a trolling motor assembly 30 attached to its front, with a trolling motor 35 submerged in the body of water. The watercraft 10 also has a motor assembly 40 attached to its rear, with a motor 45 submerged in the body of water. The trolling motor 35 and/or motor 45 can be used as a propulsion system to cause the watercraft to travel along the surface of the water.

While the depicted embodiment shows the trolling motor assembly 30 attached to the front of the watercraft 10 and as a secondary propulsion system, example embodiments described herein contemplate that the trolling motor assembly 30 may be attached in any position on the watercraft 10 and/or may be the primary propulsion system for the watercraft. Similarly, while the depicted embodiment shows the motor assembly 40 attached to the rear of the watercraft 10 and as a primary propulsion system, example embodiments described herein contemplate that the motor assembly 40 may be attached in any position on the watercraft 10 and/or may be the secondary propulsion system for the watercraft.

In some embodiments, depending on the design, a trolling motor 35 and/or a motor 45 may be gas-powered or electric. Moreover, steering may be accomplished via hand control, via foot control, or even through use of a remote control. Additionally, example embodiments described herein contemplate that the trolling motor 35 and/or motor 45 may operate autonomously through autopilot functions.

In some embodiments, the watercraft 10 may include a control panel or station that comprises one or more instruments and systems used in collection, display, and other functionality with respect to various types of marine data including, for example, fishing data, speed data, depth data, travel data, sonar data, global position sensor (GPS) data, etc. For example, the watercraft 10 may include a marine electronics device 50. The marine electronics device 50 may, for example, be used to control various aspects of the watercraft, such as navigation systems, autopilot systems, among many others (such as systems used in accordance with various embodiments described herein).

FIG. 2 illustrates an example marine chart 60, such as a navigation chart. In some embodiments, the marine chart may include navigation and/or map data such as may be retrieved from the memory of an example marine electronics device. Such an example marine chart may be displayed on one or more user interfaces of various systems of embodiments contemplated herein. For example, the trolling motor 35, the motor 45, and/or the marine electronics device 50 may have an associated user interface that is configured to display such an example marine chart. In some embodiments, as described herein, the trolling motor 35 and/or motor 45 may include a dedicated marine electronics device (such as with similar or the same functionality as marine electronics device 50).

The marine chart 60 may include one or more depth contour lines 70 that convey the depth (e.g., 44 feet) of the water at various locations on the marine chart 60. Marine chart 60 may further comprise one or more waypoints, such as waypoint 80. In some embodiments, waypoints can be inputted by a user of an example marine electronic device. For example, a user may set a current location as a waypoint on the marine chart for future reference, such as if it is a good fishing spot. In some embodiments, one or more waypoints may be pre-stored and available for display with the marine chart.

In some embodiments, a waypoint 80 may be set by a user as a location they may desire to cast to, such as a location where they have marked based on previous or current fishing activity (e.g., the location may have beneficial structure for attracting fish). However, as described herein, it may be desirable to actually maintain the marine vessel at a distance that is offset from the waypoint, such as may enable a user to cast into the waypoint directly (e.g., because the marine vessel is no sitting right on top of the waypoint). As such, in some embodiments, the user may desire to have marine vessel 12 maintain a position that is an offset distance 90 from the waypoint 80.

In some embodiments, the marine vessel 12 may include one or more autopilot systems that enable (such as through a navigation system) autonomous control of the marine vessel 12, such as to cause the marine vessel to remain an offset distance 90 away from waypoint 80. In some embodiments, the one or more autopilot systems may be configured to enable autonomous control of the marine vessel 12 to cause the marine vessel 12 to travel along a specified path around waypoint 80 at the desired offset distance (e.g., a desired orbital pattern 90). In some embodiments, the one or more autopilot systems may be configured to cause a direction of the marine vessel with respect to the waypoint to be maintained (e.g., the front of the marine vessel may also be closest to the waypoint). For example, the marine chart 60 shows a representation of the vessel 12 facing the waypoint 80 and traveling along an example orbital pattern 90.

FIG. 3 illustrates an example offset distance from a waypoint 180 within a body of water 100. Waypoint 180 is depicted as a first geographic location. The user may define an offset distance 190 from the first geographic location 180 for the marine vessel 110 to maintain, such as while an example virtual anchor proximity system is in operation (such as described herein with various embodiments). In such an example embodiments, the marine vessel 110 may be configured to maintain the offset distance 190 from the first geographic location 180.

In some embodiments, the user can input the offset distance 190 by inputting an exact number, selecting an offset distance 190 from a predetermined list, and/or any other selection/input means. As an example, a predetermined list for offset distance 190 options may include 1 foot, 5 feet, 10 feet, 20 feet, etc. Additionally, one skilled in the art would appreciate that any unit of measurement for distance may be utilized for offset distance 190 (e.g., feet, meters, yards, etc.).

During operation, the marine vessel 110 may not remain in a static location. In this regard, the location of marine vessel 110 may be impacted by a variety of factors, such as wind speed, current, rain, tide conditions, other marine vessels, wildlife, etc. To account for such movement, in some embodiments, the system may be configured to enable the marine vessel 110 to stay within a distance threshold of the offset distance 190. For example, in some embodiments, the system may utilize an inner threshold distance 170 and an outer threshold distance 172.

In some embodiments, the inner threshold distance 170 and/or the outer threshold distance 172 may be user defined and/or selected from a predetermined list. For example, the predetermined list for the inner threshold distance 170 may include 1 foot, 2 feet, 5 feet, 10 feet, etc., and the predetermined list for the outer threshold distance 172 may include the same or similar parameters. However, one skilled in the art would not only appreciate that any unit of measurement for distance may be utilized, but also that inner threshold distance 170 and outer threshold distance 172 may be different parameters. Moreover, one skilled in the art can further appreciate that the inner threshold distance 170 and outer threshold distance 172 may be predetermined by the virtual anchor proximity system depending on the offset distance 190. For instance, if the offset distance is 0-10 feet, then inner offset distance 170 and the outer offset distance 172 may be 1 foot; if the offset distance is 11-20 feet, then inner offset distance 170 and the outer offset distance 172 may be 2 feet; if the offset distance is 21-30 feet, then inner offset distance 170 and the outer offset distance 172 may be 5 feet; etc.

With reference to the illustration of FIG. 3, in some embodiments, the inner threshold distance 172 may define an inner threshold arc 194 and the outer threshold distance 170 may define an outer threshold arc 196. The distance between the inner threshold arc 194 and the outer threshold arc 196 may define a distance threshold 198. When marine vessel 110 travels outside of the distance threshold, the system may be configured to cause the one or more motors (e.g., motor 45 and/or trolling motor 35) to move the marine vessel 110 back within the distance threshold 198 so the marine vessel 110 is at the user desired offset distance 190. For example, in the example offset diagram, marine vessel 110' is shown at a location outside of the distance threshold 198, specifically outside the inner threshold arc 194. In some embodiments, once the system determines the marine vessel 110' is at this location, the system may cause the one or more motors (e.g., motor 35 and/or trolling motor 45) to move the marine vessel 110' in direction A to return to a location within the distance threshold 198. Likewise, in the example offset diagram, the marine vessel 110" is shown at a location outside of the distance threshold 198, specifically outside the outer threshold arc 196. In some embodiments, once the system determines that the marine vessel 110" is at this location, the present invention causes the one or more motors (e.g., motor 35 and/or trolling motor 45) to move the marine vessel 110" in direction B to return to a location within the distance threshold 198.

Further, in some embodiments, the system may enable the marine vessel 110 to travel to other positions that are still the offset distance 190 away from the first geographic location 180. In this regard, in some embodiments, the other positions may be represented by an offset distance arc 192. Consequently, along offset distance arc 192, the marine vessel 110 may remain at/near the desired offset distance 190 from the first geographic location 180.

In some embodiments, a user may select or create an orbital path (e.g., orbital pattern) for the marine vessel to travel around a waypoint. An orbital path may permit a user to define a pattern of travel around a waypoint. This may be beneficial to users who are trying to fish a plurality of angles around a waypoint, particularly when the waypoint may be a marked structure. In some such embodiments, the user can cast to the structure from multiple directions without having to manually control the marine vessel. As a result, in some embodiments, the system may be configured to cause the marine vessel to automatically travel around the waypoint in combination with the desired offset distance. Consequently, the marine vessel with automatically travel along the orbital path around the waypoint while remaining at a user defined offset distance from the waypoint. In some embodiments, the orbital path may be preselected from pre-programmed orbit paths or may be created by the user. The orbital paths may be created by the user through a user interface, such as the user interface depicted in FIG. 5 and FIG. 6 that will be discussed in greater detail herein. In some embodiments, the orbital path may be created on an external device and uploaded to the present invention. The user created orbital path may be uploaded utilizing cables (e.g., Ethernet cable or USB (universal serial bus) cable), Wi-Fi, Bluetooth, or the like. Though described as an orbital path, in some embodiments, a non-symmetrical path around the waypoint may be contemplated. Likewise, the orbital path may zig-zag around the waypoint or take any type path around the waypoint.

FIG. 4A illustrates an example orbital pattern 102 around the first geographic location 180. The example orbital pattern 102 is an arc that spans approximately 180° around the first geographic location 180. In such example embodiments, the system may be configured such that the user selects or inputs orbital pattern 102 and selects or inputs the first geographic location 180 and the offset distance 190. Although not shown, one skilled in the art can appreciate that the user may also select a distance threshold as shown in FIG. 3. Once the autopilot function initiates, the virtual anchor proximity system may be configured to cause the marine vessel 110 to travel along the defined path, as shown by direction C. Once the marine vessel travels to the end of the arc, the autopilot function causes the marine vessel to move in opposite direction D to travel along the arc 102. In such a regard, the marine vessel 110 remains at the desired offset distance 190 when traveling along example orbital pattern 102. Similarly, when the marine vessel 110 travels to the opposite end of the example orbital pattern 102, the autopilot function may be configured to cause the marine vessel 110 to travel back in the direction C. Furthermore, one skilled in the art can appreciate that the autopilot function may combine the example orbital pattern 102 with the distance threshold 198. Thus, as the marine vessel travels along the example orbital pattern 102, the autopilot function may further cause the marine vessel to remain within the distance threshold 198 of the offset distance 190.

FIG. 4B illustrates another example orbital pattern 104. Example orbit pattern 104 is a circle, wherein the first geographic location 180 is the center point. In some embodiments, the example orbit pattern 104 circle may be defined by a radius equal to the user input or selected offset distance 190. When the autopilot function for example orbit pattern 104 is in operation, the autopilot may be configured to cause the marine vessel 110 to travel around the first geographic location, such as in a counter clockwise direction E. Likewise, the example orbit pattern 104 may be selected in combination with the distance threshold 198.

One skilled in the art can appreciate that a variety of orbit patterns may be available for a user to select. For example, the orbital paths may cause the marine vessel 110 to travel around the first geographic location 180 in an interval manner, where the marine vessel stays at a specified location for a period of time (e.g., 30 seconds, 1 minute, 5 minutes, etc.) before moving along the travel path to a new location. Additionally or alternatively, the orbital path may comprise a plurality of offset distances. For example, at one location on the travel path, the user may desire to be at a lesser offset distance when compared to a second location on the travel path. This may be beneficial to users who are fishing around certain structures and in varying water depth conditions for instance, and the orbit path may be preprogrammed or created by the user on the present invention.

As described herein, in some embodiments, the system may be configured to maintain the marine vessel in a certain direction with respect to the first geographic location. For example, the system may be configured to maintain the front of the marine vessel facing the first geographic location. Such example embodiments may be useful for enabling easily maintained fishing while the marine vessel travels along the orbit path and/or stays within an offset distance of the first geographic location.

Example System Architecture

FIG. 5 shows a block diagram of an example virtual proximity navigational system 200 with a motor housing 240 and a marine electronics device 250. As shown, the motor housing 240 and the marine electronics device 250 may include a number of different modules or components, each of which may comprise any device or means embodied in either hardware, software, or a combination of hardware and software configured to perform one or more corresponding functions.

The virtual proximity navigational system 200 may also include one or more communications modules configured to communicate with one another in any of a number of different manners including, for example, via a network. In this regard, the communication interface 242 may include any of a number of different communication backbones or frameworks including, for example, Ethernet, NMEA 2000 framework, GPS, cellular, WiFi, or other suitable networks. The network may also support other data sources, including, for example, GPS, autopilot, engine data, compass, radar, etc. Numerous other peripheral, remote devices, such as one or more wired or wireless multi-function displays, may be connected to the virtual proximity navigational system 200.

The marine electronics device 250 may include a memory 252, a processor 254, a communication interface 256, one or more sensors (e.g., position sensor 258), and a user interface 260.

The processor 254 may be any means configured to execute various programmed operations or instructions stored in a memory device such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 254 as described herein. In this regard, the processor 254 may be configured to analyze electrical signals communicated thereto, such as to provide a distance and direction signal to move a marine vessel (e.g., marine vessel 110 as shown in FIG. 3, FIG. 4A, and FIG. 4B). For example, the processor 254 may be configured to receive position sensor data and process the distance and direction signal to cause a motor (e.g., 244) to move the marine vessel.

In some embodiments, the processor 254 may be further configured to implement signal processing or enhancement features to improve display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other watercraft, etc.

The memory 252 may be configured to store instructions, computer program code, marine data, such as sonar data, chart data, location/position data, and other data associated with the sonar system in a non-transitory computer readable medium for use, such as by the processor.

The communication interface 256 may be configured to enable communication connection to external systems (e.g., motor housing 240, although other systems are contemplated by embodiments of the present invention). In this manner, the processor 254 may retrieve stored data from a remote, external server via an external network (not shown) in addition to or as an alternative to the onboard memory 252.

The position sensor 258 may be configured to determine the current position and/or location of a marine vessel (e.g., marine vessel 110 as shown in FIG. 3, FIG. 4A, and FIG. 4B) and/or an associated marine electronics device. For example, the position sensor 258 may comprise a GPS, a sonar system, or other location detection system.

The user interface 260 may be configured to display and receive data and/or user inputs. For example, the user interface may receive user input for a waypoint location (e.g., first geographic location 180 as shown in FIG. 3, FIG. 4A, and FIG. 4B), an offset distance (e.g., offset distance 190 as shown in FIG. 3, FIG. 4A, and FIG. 4B), and/or an orbital path (e.g., orbital pattern 102 in FIG. 4A and orbital pattern 104 in FIG. 4B). Moreover, the user interface 260 may comprise a display screen, such as to output a cast distance to the user, wherein the cast distance is the distance of the marine vessel to the waypoint (e.g., in some cases, the offset distance). The display screen may be, for example, a conventional LCD (liquid crystal display), a touch screen display, mobile device, or any other suitable display known in the art upon which images may be displayed.

In some embodiments, the user interface 260 may be configured to present one or more sets of marine data (or images generated from the one or more sets of data). Such marine data may, for example, include chart data, radar data, weather data, location data, position data, orientation data, sonar data, or any other type of information relevant to the watercraft. In some embodiments, the display may be configured to present such marine data simultaneously as in split-screen mode. In some embodiments, a user may select any of the possible combinations of the marine data for display.

The user interface 260 may further include, for example, a keyboard, keypad, function keys, mouse, scrolling device, input/output ports, touch screen, or any other mechanism by which a user may interface with the system.

The motor housing 240 comprises a communication interface 242, a motor 244, and other sensors 246. Similar to communication interface 256 on the marine electronics device 250, the communication interface 242 may similarly include any of a number of different communication backbones or frameworks including, for example, Ethernet, the NMEA 2000 framework, GPS, cellular, WiFi, or other suitable networks. The network may also support other data sources, including GPS, autopilot, engine data, compass, radar, etc.

In some embodiments the motor housing may be an inboard motor, an outboard motor, a trolling motor, etc. The motor 244 may be gas powered, electric powered, or powered by any other suitable means.

The other sensors 246 may collect any type of data. As an example, the other sensors 246 may be configured to collect engine data, water temperature, current, compass, radar, speed, revolutions per minute (rpm), run time, etc. The other sensors 246 may be controlled internally within the motor housing 240 or by the processor 254 of the marine electronics device 250 (such as detailed herein).

FIG. 6 shows a block diagram of another example virtual proximity system 300 capable for use with several embodiments of the present invention. The virtual proximity system 300 is similar to and includes many of the same components as the virtual proximity system 200 shown in FIG. 5. Notably, however, different from the virtual proximity system 200 shown in FIG. 5, the virtual proximity system 300 is contained within a motor assembly 305.

The motor assembly 305 comprises a built-in marine electronics device 310 and a propulsion assembly 350. The marine electronics device 310 includes a memory 312, a processor 314, a communication interface 316, a user interface 330, and a position sensor 320, all which perform similar functions to the like components included in virtual anchor system 200. Though shown within the marine electronics device 310, in some embodiments, one or more components may be physically outside of the marine electronics device 310. Likewise, though shown within the motor assembly 305, in some embodiments, one or more components may be physically outside of the motor assembly 305.

The propulsion assembly 350 comprises a communication interface 352, a motor 354, and other sensors 356, all which perform similar functions to the like components included in system 200. In some embodiments, the user interface 330 and the position sensor 320 may be included within the propulsion assembly 350.

The motor assembly 305 may be an inboard motor, an outboard motor, a trolling motor, etc. In some embodiments, the system 300 may be contained within one or more motors (e.g., a trolling motor 35) of the marine vessel (e.g., marine vessel 110 as shown in FIG. 3).

Example Flowcharts and Operations

Some embodiments of the present invention provide methods for receiving and processing data to cause a marine vessel to automatically change its current location to remain at an offset distance from a waypoint and/or remain on a desired orbital path. Various examples of the operations performed in accordance with some embodiments of the present invention will now be provided with reference to FIGS. 7-9.

FIG. 7 illustrates a flowchart according to an example method for receiving and processing data, and causing a marine vessel to change location according to an example embodiment 400. The operations illustrated in and described with respect to FIG. 7 may, for example, be performed by, with the assistance of, and/or under the control of one or more of the processor 254/314, communication interface 256/316, position sensor 258/320, other sensors 246/356, user interface 260/330, and/or motor 244/354. Operation 402 may comprise receiving user input indicating a first geographic location (e.g., 180) and an offset distance (e.g., 190). The user interface 260/330, processor 254/314, and memory 252/312 may, for example, provide means for performing operation 402.

Operation 404 may comprise determining a current geographic location of a marine vessel (e.g., 110). The position sensor 258/320, other sensors 246/356, and processor 254/314 may, for example, provide means for performing operation 404. Operation 406 may comprise determining if the current geographic location is within a distance threshold (e.g., 198) of the offset distance from the first geographic location. The processor 254/314 and memory 252/312 may, for example, provide the means for performing operation 406. In operation 406, if the current geographic location is within the distance threshold of the offset distance from the first geographic location then operation 404 is repeated. Therefore, in some embodiments, operation 408 may not occur until the current geographic location is outside the distance threshold of the offset distance from the first geographic location. Operation 408 may comprise causing one or more motors to move a marine vessel within the distance threshold of the offset distance from the first geographic location. The processor 254/314, memory 252/312, communication interface 256/242/316/352, and motor 244/354 may, for example, provide the means for performing operation 408.

FIG. 8 illustrates a flowchart according to another example method for receiving and processing data, and causing a marine vessel to change location according to an example embodiment 500. The operations illustrated in and described with respect for FIG. 8 may, for example, be performed by, with the assistance of, and/or under the control of one or more of the processor 254/314, communication interface 256/316, position sensor 258/320, other sensors 246/356, user interface 260/330 and/or motor 244/354.

Operation 502 may comprise receiving user input data indicating a first geographic location (e.g., 180) and an offset distance (e.g., 190). The user interface 260/330, processor 254/314, and memory 252/312 may, for example, provide means for performing operation 502. Operation 504 may comprise determining a current geographic location of a marine vessel (e.g., 110). The position sensor 258/320, other sensors 246/356, and processor 254/314 may, for example, provide means for performing operation 504.

Operation 506 may comprise determining if the current geographic location is within a distance threshold (e.g., 198) of the offset distance from the first geographic location. The processor 254/314 and memory 252/312 may, for example, provide the means for performing operation 506. Similar to operation 406, in operation 506, if the current geographic location is within the distance threshold of the offset distance from the first geographic location, operation 504 is repeated. Thus, in some embodiments, operation 508 may not occur until the current geographic location is outside the distance threshold of the offset distance from the first geographic location. Once the current geographic location is outside the distance threshold, operation 508 may comprise determining a navigation control signal for one or more motors on a marine vessel (e.g., 110). The navigation control signal may comprise an electrical signal, a mechanical signal, etc. Furthermore, the navigation control signal may, for example, comprise a direction signal and/or a distance signal to cause the marine vessel to move to a location within the distance threshold of the offset distance from the first geographic location. The processor 254/314 and memory 252/312 may, for example, provide the means for performing operation 508.

Operation 510 may comprise causing one or more motors to move a marine vessel within the distance threshold of the offset distance from the first geographic location. The processor 254/314, memory 252/312, communication interface 256/242/316/352, and motor 244/354 may, for example, provide the means for performing operation 510. After operation 510 is complete, operation 512 may comprise repeating operation 504, such as after expiration of a time interval. The time interval may be measured in any unit of time, and may include a range of user selected or preprogrammed values. For example, the interval may be near instantaneous, 1 second, 5 seconds, 10 seconds, 1 minute, 2 minutes, etc. The interval may be input on a user interface (e.g., 260/330) and may be input by the user or selected from a range of values. Moreover, the interval may be preprogrammed by the virtual proximity navigational system and may vary depending on the offset distance entered by the user. The processor 254/314, memory 252/312, communication interface 256/242/316/352, and user interface 260/330 may, for example, provide the means for performing operation 512.

After operation 506, operation 514 may comprise determining a cast distance. In some embodiments, the cast distance may be the offset distance (such as may be determined based on the pre-set or inputted cast distance). In some embodiments, the cast distance may be determined, for example, by evaluating the distance between the current geographic location and the waypoint (i.e., first geographic location 180). For example, the actual distance between the current position of the watercraft and the waypoint may be determined. In such a regard, in some cases, the watercraft may be within the distance threshold of the desired offset distance, but currently at a different (e.g., slightly different) distance than the offset distance. For example, the desired offset distance may be 10 feet, the distance threshold may be between 8 feet-12 feet, and the current distance of the watercraft to the waypoint may be 9 feet. In such an example, the system may determine the cast distance to be 9 feet. The cast distance may be determined using any distance unit such as feet, yards, meters, etc. The processor 254/314, memory 252/312, position sensor 258/320, and user interface assembly 260/330 may, for example, provide the means for performing operation 514. Operation 516 may comprise displaying the cast distance on the user interface. The processor 254/314, memory 252/312, and user interface 260/330 may, for example, provide the means for performing operation 516.

FIG. 9 illustrates a flowchart according to another example method for receiving and processing data, and causing a marine vessel to change location according to an example embodiment 600. The operations illustrated in and described with respect for FIG. 9 may, for example, be performed by, with the assistance of, and/or under the control of one or more of the processor 254/314, communication interface 256/316, position sensor 258/320, other sensors 246/356, user interface 260/330 and/or motor 244/354.

Operation 602 may comprise receiving user input data indicating a first geographic location (e.g., 180) and an offset distance (e.g., 190). The user interface 260/330, processor 254/314, and memory 252/312 may, for example, provide means for performing operation 602. Operation 604 may comprise receiving user input for an orbital pattern (i.e., 102/104). The user interface assembly 260/330, processor 254/314, and memory 252/312 may, for example, provide means for performing operation 604. Operation 606 may comprise determining a current geographic location of a marine vessel (e.g., 110). The position sensor 258/320, other sensors 246/356, and processor 254/314 may, for example, provide means for performing operation 606.

Operation 608 may comprise determining if the current geographic location is within a distance threshold (e.g., 198) of the offset distance from the first geographic location and/or on the defined orbital pattern. The processor 254/314 and memory 252/312 may, for example, provide the means for performing operation 608. Similar to operation 406, in operation 608, if the current geographic location is within the distance threshold of the offset distance from the first geographic location and/or on the orbital pattern, operation 606 is repeated. Thus, in some embodiments, operation 610 may not occur until the current geographic location is outside the distance threshold and/or off the defined orbital pattern. Once the current geographic location is outside the distance threshold and/or off the defined orbital pattern, operation 610 may comprise determining a navigation control signal for one or motors on a marine vessel (e.g., 110) similar to operation 508 of FIG. 8. The processor 254/314 and memory 252/312 may, for example, provide the means for performing operation 608. Operation 612 may comprise causing one or more motors to move a marine vessel within the distance threshold of the offset distance from the first geographic location and/or back onto the defined orbital pattern. The processor 254/314, memory 252/312, communication interface 256/242/316/352, and motor 244/354 may, for example, provide the means for performing operation 612.

FIGS. 7-9 illustrate flowcharts of example systems, methods, and computer program products according to example embodiments provided herein. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 252/312 and executed by, for example, the processor 254/314. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device to cause a series of operations to be performed on the computer or other programmable apparatus to produce a computer-implemented process such that the instructions which execute on the computer or other programmable apparatus implement the functions specified in the flowchart block(s).

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

The invention claimed is:

1. An apparatus associated with a marine vessel, the apparatus comprising:
 a processor and memory including computer program code, the memory and the computer program code configured to, with the processor, cause the apparatus to:
  receive user input indicating at least a first geographic location and a desired offset distance as a minimum distance to maintain away from the first geographic location, wherein the minimum distance is greater than zero,
  determine a current geographic location of at least one of the marine vessel or the apparatus,
  determine if the current geographic location is within a distance threshold of the desired offset distance from the first geographic location, and
  cause, in an instance in which the current geographic location is not within the distance threshold, one or more propulsion motors of the marine vessel to operate to cause the marine vessel to move to a new geographic location that is within the distance threshold of the desired offset distance from the first geographic location.

2. The apparatus of claim 1, wherein the memory and the computer program code are further configured to, with the processor, cause the apparatus to:
 determine a navigation control signal for the one or more propulsion motors of the marine vessel, wherein operation of the one or more propulsion motors according to the navigation control signal causes the marine vessel to move to the new geographic location.

3. The apparatus of claim 2, wherein the navigation control signal comprises a distance for the marine vessel to travel to move to the new geographic location.

4. The apparatus of claim 2, wherein the navigation control signal comprises a direction for the marine vessel to travel to move to the new geographic location.

5. The apparatus of claim 1, wherein the memory and the computer program code are further configured to, with the processor, cause the apparatus to determine if the current geographic location is within the distance threshold of the desired offset distance from the first geographic location at predetermined time intervals.

6. The apparatus of claim 1, wherein the memory and the computer program code are further configured to, with the processor, cause the apparatus to:
receive user input indicating a desired orbital path, wherein the desired orbital path defines a pattern of travel of the marine vessel around the first geographic location that keeps the marine vessel within the distance threshold of the desired offset distance from the first geographic location.

7. The apparatus of claim 1, wherein the memory and the computer program code are further configured to, with the processor, cause the apparatus to:
determine a cast distance by at least one of comparing the current geographic location to the first geographic location and determining the desired offset distance, and
cause, via a user interface, display of the cast distance.

8. The apparatus of claim 1, wherein the current geographic location of the at least one of the marine vessel or the apparatus is based on a global positioning system (GPS) signal or a sonar signal.

9. The apparatus of claim 1, wherein the apparatus is a trolling motor.

10. A system associated with a marine vessel, the system comprising:
a position sensor; and
an apparatus comprising a processor and memory including computer program code, the memory and the computer program code configured to, with the processor, cause the apparatus to:
receive user input indicating at least a first geographic location and a desired offset distance as a minimum distance to maintain away from the first geographic location, wherein the minimum distance is greater than zero,
determine a current geographic location of at least one of the marine vessel or the system using the position sensor,
determine if the current geographic location is within a distance threshold of the desired offset distance from the first geographic location, and
cause, in an instance in which the current geographic location is not within the distance threshold, one or more propulsion motors of the marine vessel to operate to cause the marine vessel to move to a new geographic location that is within the distance threshold of the desired offset distance from the first geographic location.

11. The system of claim 10, wherein the memory and the computer program code are further configured to, with the processor, cause the apparatus to:
determine a navigation control signal for the one or more propulsion motors of the marine vessel, wherein operation of the one or more propulsion motors according to the navigation control signal causes the marine vessel to move to the new geographic location.

12. The system of claim 11, wherein the navigation control signal comprises a direction or a distance for the marine vessel to travel to move to the new geographic location.

13. The system of claim 10, wherein the memory and the computer program code are further configured to, with the processor, cause the apparatus to:
receive user input indicating a desired orbital pattern, wherein the desired orbital pattern defines a pattern of travel of the marine vessel around the first geographic location that keeps the marine vessel within the distance threshold of the desired offset distance from the first geographic location.

14. The system of claim 10, wherein the memory and the computer program code are further configured to, with the processor, cause the apparatus to:
determine if the current geographic location is within the distance threshold of the desired offset distance from the first geographic location at predetermined time intervals.

15. The system of claim 10, wherein the position sensor is configured to determine the current geographic location based on a global positioning system (GPS) signal.

16. The system of claim 10, wherein the system further comprises the one or more propulsion motors.

17. An apparatus associated with a marine vessel, the apparatus comprising:
a processor and memory including computer program code, the memory and the computer program code configured to, with the processor, cause the apparatus to:
receive user input indicating at least a first geographic location and a desired offset distance as a minimum distance to maintain away from the first geographic location, wherein the minimum distance is greater than zero,
receive user input indicating a desired orbital path around the first geographic location, wherein the desired orbital path defines a pattern of travel of the marine vessel around the first geographic location that keeps the marine vessel within a distance threshold of the desired offset distance from the first geographic location, and
cause one or more propulsion motors of the marine vessel to operate to cause the marine vessel to travel according to the desired orbital path.

18. The apparatus of claim 17, wherein the memory and the computer program code are further configured to, with the processor, cause the apparatus to:
determine a current geographic location of at least one of the marine vessel or the apparatus,
determine if the current geographic location is within a first distance threshold of the desired offset distance from the first geographic location and within a second distance threshold of the desired orbital path, and
in an instance in which the current geographic location is not within the first distance threshold and the second distance threshold:
determine a marine control signal for operating one or more propulsion motors of the marine vessel to cause the marine vessel to move to a new geographic location that is within the first distance threshold and within the second distance threshold, wherein the marine control signal comprises at least one of a distance or a direction, and cause the one or more propulsion motors of the marine vessel to operate to cause the marine vessel to move to the new geographic location.

19. The apparatus of claim 17, wherein the apparatus is a trolling motor.

20. The apparatus of claim 17, wherein the apparatus is a marine electronic device.

\* \* \* \* \*